United States Patent
Kutz et al.

(10) Patent No.: US 10,637,515 B2
(45) Date of Patent: Apr. 28, 2020

(54) PERFORMING DIGITAL PRE-DISTORTION (DPD) TRAINING USING A SECONDARY NETWORK

(71) Applicant: QUALCOMM Incorporated, San Diego, CA (US)

(72) Inventors: Gideon Shlomo Kutz, Ramat Hasharon (IL); Igor Gutman, Ramat Gan (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/372,132

(22) Filed: Apr. 1, 2019

(65) Prior Publication Data
US 2019/0312605 A1  Oct. 10, 2019

Related U.S. Application Data

(60) Provisional application No. 62/653,311, filed on Apr. 5, 2018.

(51) Int. Cl.
*H04B 1/04* (2006.01)
*H04W 88/06* (2009.01)
*H04B 1/00* (2006.01)

(52) U.S. Cl.
CPC ............... *H04B 1/04* (2013.01); *H04B 1/006* (2013.01); *H04B 2001/0425* (2013.01); *H04W 88/06* (2013.01)

(58) Field of Classification Search
CPC .. H04B 1/04; H04B 1/006; H04B 2001/0425; H04W 88/06; H03F 1/3247; H03F 3/24; H03F 1/3241; H04L 27/368; H03G 3/3042
See application file for complete search history.

(56) References Cited

U.S. PATENT DOCUMENTS

| | | | |
|---|---|---|---|
| 9,819,373 B2 | 11/2017 | Janani et al. | |
| 2014/0133527 A1* | 5/2014 | Dick | H03F 1/3247 375/219 |
| 2014/0219392 A1* | 8/2014 | Chen | H04B 1/0475 375/297 |
| 2015/0350964 A1 | 12/2015 | Lin et al. | |
| 2019/0280730 A1* | 9/2019 | Zhang | H03F 3/68 |

OTHER PUBLICATIONS

Ding L., et al., "Concurrent dual-band digital predistortion", Microwave Symposium Digest (MTT), 2012 IEEE MTT-S International, IEEE, Jun. 17, 2012 (Jun. 17, 2012), pp. 1-3, XP032217048, DOI: 10.1109/MWSYM.2012.6259532, ISBN: 978-1-4673-1085-7, Section 2.
International Search Report and Written Opinion—PCT/US2019/025396—ISA/EPO—dated Aug. 13, 2019.

* cited by examiner

*Primary Examiner* — Ted M Wang
(74) *Attorney, Agent, or Firm* — Harrity & Harrity LLP/Qualcomm Incorporated (57) ABSTRACT

Various aspects of the present disclosure generally relate to wireless communication. In some aspects, a user equipment may determine that a digital pre-distortion (DPD) training is to be performed by a modem, wherein the modem is configured to facilitate communication between the UE and a primary network associated with the UE, and configure the modem to perform the DPD training using a secondary network associated with the UE. Numerous other aspects are provided.

30 Claims, 4 Drawing Sheets

PERFORMING DIGITAL PRE-DISTORTION (DPD) TRAINING USING A SECONDARY NETWORK

CROSS-REFERENCE TO RELATED APPLICATIONS UNDER 35 U.S.C. § 119

This application claims priority to U.S. Provisional Patent Application No. 62/653,311, filed on Apr. 5, 2018, entitled "TECHNIQUES AND APPARATUSES FOR PERFORMING DIGITAL PRE-DISTORTION (DPD) TRAINING USING A SECONDARY NETWORK," which is hereby expressly incorporated by reference herein.

FIELD OF THE DISCLOSURE

Aspects of the present disclosure generally relate to wireless communication, and more particularly to techniques and apparatuses for performing digital pre-distortion (DPD) training using a secondary network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a digital pre-distortion (DPD) training is to be performed by a modem, wherein the modem is configured to facilitate communication between the UE and a primary network associated with the UE, and configuring the modem to perform the DPD training using a secondary network associated with the UE.

In some aspects, a user equipment for wireless communication may include memory and one or more processors operatively coupled to the memory. The memory and the one or more processors may be configured to determine that a DPD training is to be performed by a modem, wherein the modem is configured to facilitate communication between the UE and a primary network associated with the UE and configure the modem to perform the DPD training using a secondary network associated with the UE.

In some aspects, a non-transitory computer-readable medium may store one or more instructions for wireless communication. The one or more instructions, when executed by one or more processors of a user equipment, may cause the one or more processors to determine that a DPD training is to be performed by a modem, wherein the modem is configured to facilitate communication between the UE and a primary network associated with the UE and configure the modem to perform the DPD training using a secondary network associated with the UE.

In some aspects, an apparatus for wireless communication may include means for determining that a DPD training is to be performed by a modem, wherein the modem is configured to facilitate communication between the apparatus and a primary network associated with the apparatus and means for configuring the modem to perform the DPD training using a secondary network associated with the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
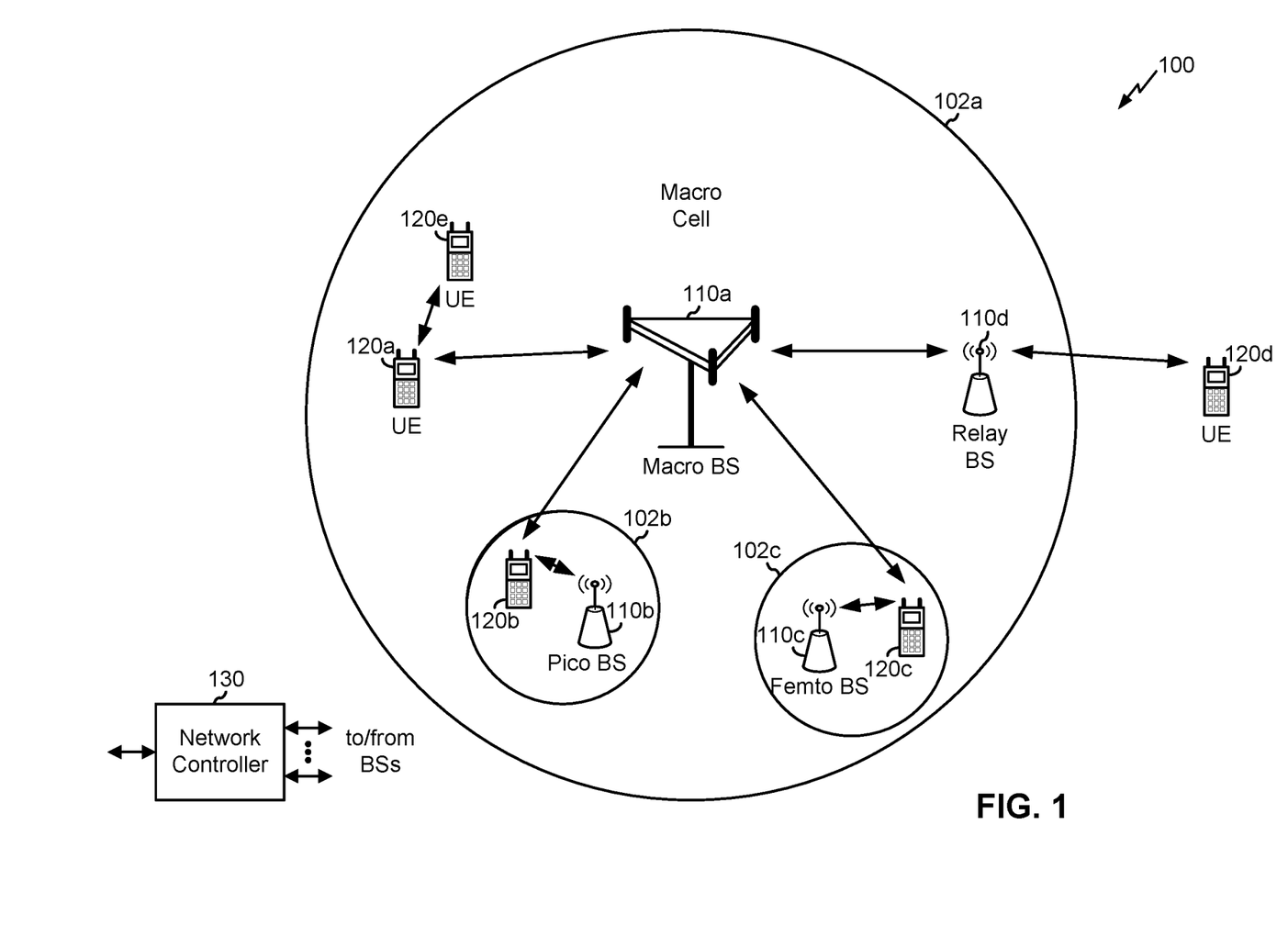
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. In some aspects, the network 100 may be a licensed network. For example, the network 100 may require a license or subscription to permit a UE 120 to communicate with BS 110.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
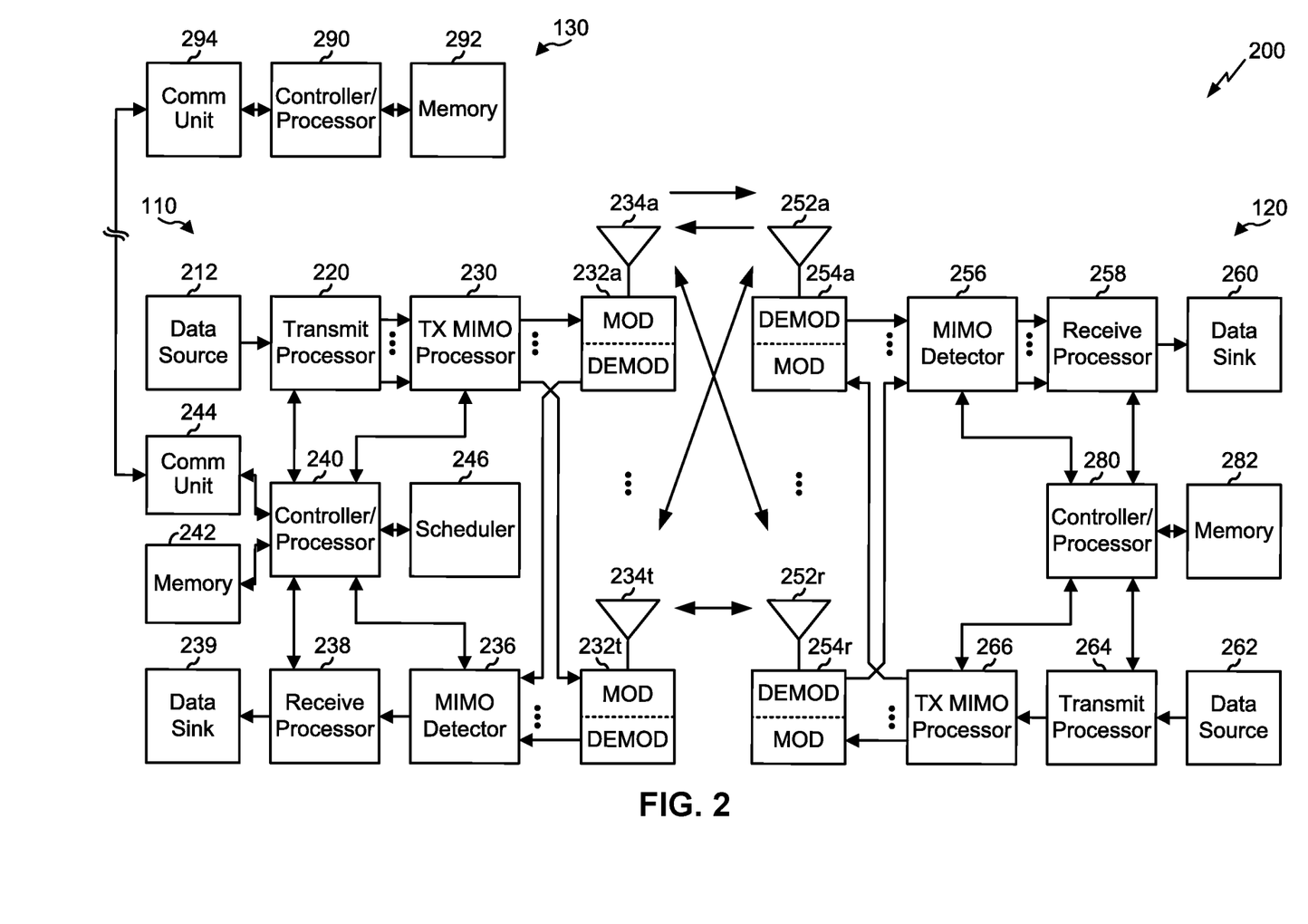
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. UE 120 may include a modem. For example, one or more components of UE 120 (e.g., of antenna 252, modulator 254, transmit processor 264, TX MIMO processor 266, and/or the like) may form or be included within a modem of the UE 120 that is used to transmit a signal to BS 110. In some aspects, UE 120 may include a mixer that enables UE 120 (e.g., the modem) to transmit and/or receive signals at different frequencies or to switch between bands of communication (e.g., between a 5G band and a Wi-Fi band). Accordingly, the UE 120 and/or a modem of the UE 120 may facilitate communication between UE 120 and multiple networks that use different bands.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with performing digital pre-distortion (DPD) training using a secondary network, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a DPD training is to be performed by a modem, wherein the modem is configured to facilitate communication between the UE and a primary network associated with the UE; means for configuring the modem to perform the DPD training using a secondary network associated with the UE; and/or the like. In some aspects, such means may include one or more components of UE 120 described in connection with FIG. 2.

As indicated above, FIG. 2 is provided merely as an example. Other examples may differ from what is described with regard to FIG. 2.

In many instances, a UE includes a transmitter path with one or more non-linear components, such as an amplifier (e.g., a high power amplifier (HPA)), with limited dynamic range (DR), that distorts the transmitted signal due to a high peak to average power ratio (PAPR). For example, one or more of antenna 252, modulator 254, transmit processor 264, TX MIMO processor 266, and/or the like may include an HPA that distorts the transmitted signal. A power back-off (BO) may be implemented to address the distortions; however, use of a power BO may result in less power efficiency of the UE as the greater the power BO that is applied, the less power that is transmitted to the channel. In some instances, the one or more components along the transmitter path of the UE may perform digital pre-distortion (DPD) to address the distortion of the transmitted signal. Using the DPD, non-linearity in the transmitted signal is addressed and the need for a power BO is reduced.

In some instances, distortion or non-linearity of the transmitted signal can vary based at least in part on the temperature (or temperature changes) of the UE. As a consequence, DPD training may be performed while the UE is online (e.g., in communication with wireless network 100) when a temperature change occurs and/or when the UE is scheduled to properly configure the DPD to address the non-linearity of the transmitted signal. During the DPD training, a modem of the UE transmits a signal at high power and loops back the transmitted signal (e.g., over the air, using an internal leakage mechanism, and/or the like) to determine the differences between the transmitted signal and the loopback signal. Based on the differences between the transmitted signal and the loopback signal, the UE may configure a DPD to address the non-linearities along the transmission path.

The UE, when performing the DPD training while online or in communication with a BS, may be limited to using resources associated with an allocated grant from the BS (e.g., BS 110). In some instances, the BS may not allocate uplink resources or information in a desired amount of time to enable the UE to perform the DPD training and/or may not allocate sufficient bandwidth for the UE to perform the DPD training effectively. Furthermore, in some instances, the signal transmitted during the DPD training may be affected by a poor error vector magnitude (EVM) caused by HPA non-linearities being unaddressed, which leads to likely retransmission and loss of spectral efficiency.

Some aspects described herein provide DPD training that uses a secondary network (e.g., an unlicensed network) to enable the UE (or a user associated with the UE) to select transmission timing and/or a transmission waveform for the DPD training. Accordingly, in some aspects described herein, the UE is not limited to using a configuration as determined by a BS, but rather, the configuration can be set by the UE. Accordingly, some aspects described herein may provide enhanced DPD training by ensuring that the DPD training can be timely and accurately performed. Therefore, some aspects of the present disclosure may conserve resources (e.g., network resources, processing resources, and/or the like) associated with performing DPD training. For example, network resources may be conserved by avoiding the need to perform one or more subsequent DPD trainings due to insufficient bandwidth. Furthermore, network resources may be conserved by avoiding the need to retransmit signals because the DPD was not properly adjusted in a timely manner (e.g., due to the BS not communicating a grant for the DPD training in time and thus the DPD training not being performed). Moreover, some aspects described herein conserve processing resources associated with performing the one or more subsequent DPD trainings and/or retransmitting signals.

Figure 3:
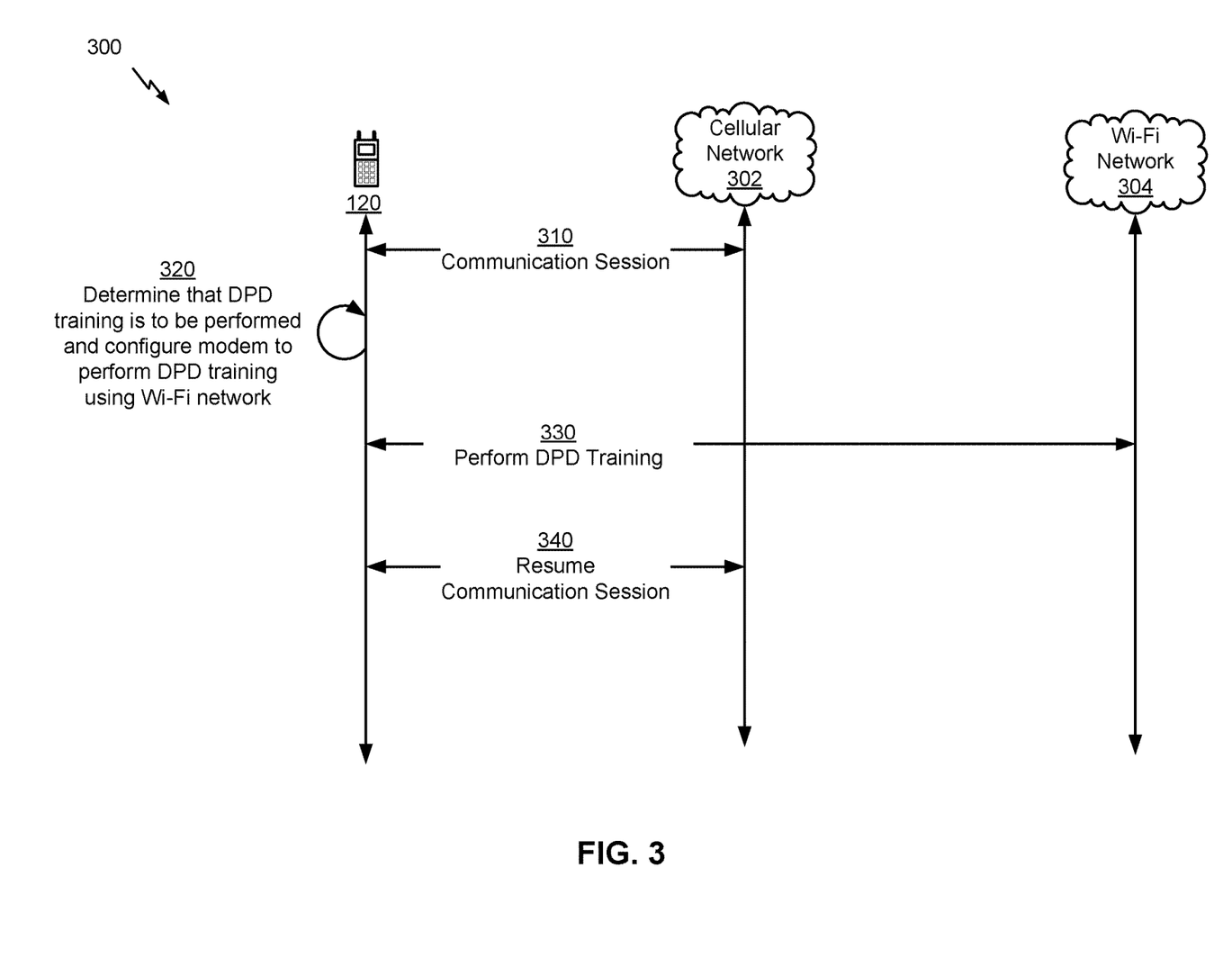
FIG. 3 is a diagram illustrating an example of performing digital pre-distortion (DPD) training using a secondary network, in accordance with various aspects of the present disclosure.

FIG. 3 is a diagram illustrating an example 300 of performing digital pre-distortion (DPD) training using a secondary network, in accordance with various aspects of the present disclosure. Example 300 of FIG. 3 includes a UE 120, a cellular network 302 (which may be referred to herein as a "primary network" or a "licensed network"), such as an NR network (e.g., 5G network), an LTE network, and/or the like, and a Wi-Fi network 304 (which may be referred to herein as a "secondary network" or an "unlicensed network"). Using previous techniques, when performing a DPD training, UE 120 may be limited to a configuration provided by a BS 110 of cellular network 302, which is a licensed network of UE 120. Some aspects described herein enable UE 120 to configure DPD training settings (e.g., transmission timing, transmission bandwidth, and/or the like) using the Wi-Fi network, which may be an unlicensed network.

As shown in FIG. 3, and by reference number 310, UE 120 establishes a communication session with cellular network 302. For example, UE 120 may establish a communication session with a BS 110 of cellular network 302. In some aspects, the communication session is a licensed communication session that is authorized by a subscription and/or agreement that UE 120 is capable of communicating with cellular network 302 and/or via cellular network 302. Accordingly, in some aspects, cellular network 302 may be considered a primary network that UE 120 uses for communication.

As further shown in FIG. 3, and by reference number 320, UE 120 determines that DPD training is to be performed and configures a modem of UE 120 to perform the DPD training using Wi-Fi network 304. In some aspects, UE 120 may determine that DPD training is to be performed based on a schedule and/or an event indicating that the DPD training is to be performed. For example, DPD training may be scheduled to be performed periodically (e.g., every minute, every five minutes, and/or the like). Additionally, or alternatively, UE 120 may be configured to monitor one or more characteristics of UE 120 and/or events associated with UE 120 to determine whether to perform DPD training. For example, UE 120 may monitor a temperature associated with UE 120 (e.g., an internal temperature, a temperature of one or more components of UE 120, an external temperature, and/or the like). In such cases, when UE 120 determines that the temperature changes a threshold amount (e.g., one degree, five degrees, and/or the like), the UE 120 may determine that DPD training is to be performed based on the temperature change. Additionally, or alternatively, UE 120 may monitor other characteristics (e.g., transmitter power, battery power, and/or the like) and determine that DPD training is to be performed based on the other characteristics or a threshold change to the other characteristics.

According to some aspects, UE 120 may configure a modem to perform the DPD training via Wi-Fi network 304 by switching a mixer of the UE 120 from a band of cellular network 302 (e.g., an LTE band, a 5G band, and/or the like) to a band of Wi-Fi network 304. In some aspects, when configuring the modem to perform the DPD training, UE 120 may select at least one of a transmission timing (e.g., when the DPD training signal is to be transmitted and/or looped back) and/or a transmission waveform (e.g., bandwidth, transmission power, and/or the like) for the DPD training using the Wi-Fi network. For example, UE 120 may select the transmission timing and/or transmission waveform based at least in part on a user input, based at least in part on a specification of UE 120 and/or Wi-Fi network 304, based at least in part on one or more characteristics of UE 120 (e.g., temperature, transmission power capabilities, remaining battery power, and/or the like) of the UE 120, and/or the like. Accordingly, UE 120 may select the transmission timing for the DPD training and switch the mixer to a band of Wi-Fi network 304 to perform the DPD training. In some aspects, UE 120 may include a single modem that may be used to access cellular network 302 and Wi-Fi network 304 or a plurality of separate modems to access cellular network 302 and Wi-Fi network 304. For example, a first one of the plurality of modems may be used to access cellular network 302 and a second one of the plurality of modems may be used to access Wi-Fi network 304.

The band of Wi-Fi network 304 may have sufficient bandwidth to enable UE 120 to perform the DPD training using Wi-Fi network 304. For example, to perform a sub-6 5G DPD training (e.g., an NR DPD training where the used spectrum is below 6 GHz), Wi-Fi network 304 may have up to a threshold bandwidth (e.g., 160 MHz) to perform the sub-6 5G DPD training.

As further shown in FIG. 3, and by reference number 330, UE 120 may perform the DPD training using Wi-Fi network 304. UE 120 may use any suitable technique to perform the DPD training. For example, UE 120 may transmit a signal via a band of Wi-Fi network 304 and loop back the signal (e.g., over the air and/or through an internal leakage mechanism). Accordingly, the DPD training can be performed using Wi-Fi network 304 and/or any other secondary or unlicensed network available to UE 120. The DPD training may be used to address non-linearities within transmitted signals from UE 120.

As further shown in FIG. 3, and by reference number 340, UE 120 resumes (or continues) the communication session with cellular network 302. In some aspects, the communication session and/or communications between UE 120 and cellular network 302 are paused, discontinued, and/or the like while the UE 120 performs the DPD training. In some aspects, the communication session between UE 120 and cellular network 302 is not paused or discontinued while the DPD training is performed via Wi-Fi network 304. Accordingly, UE 120 may perform the DPD training using Wi-Fi network 304 during the communication session with cellular network 302. For example, UE 120 may be configured to determine that UE 120 is not scheduled to transmit a communication via cellular network 302 (e.g., via a licensed band) and switch to a band of Wi-Fi network 304 to perform the DPD training. In such cases, the communication session between UE 120 and cellular network 302 may not be broken. In some aspects, after performing the DPD training using Wi-Fi network 304 is complete, to resume the communication session, UE 120 (and/or a modem of UE 120) may switch a mixer from a band of Wi-Fi network 304 back to a band of cellular network 302. In some aspects, if UE 120 determines that DPD training is to be performed and is scheduled to communicate with cellular network 302, UE 120 may perform the DPD training during the scheduled communication with cellular network 302.

Accordingly, UE 120 may have adjusted a DPD of UE to address non-linearities or distortions in the transmitted signals. As a result, UE 120 may conserve processing resources, network resources, and/or power resources associated with transmitting signals.

As indicated above, FIG. 3 is provided as an example. Other examples may differ from what is described with respect to FIG. 3.

Figure 4:
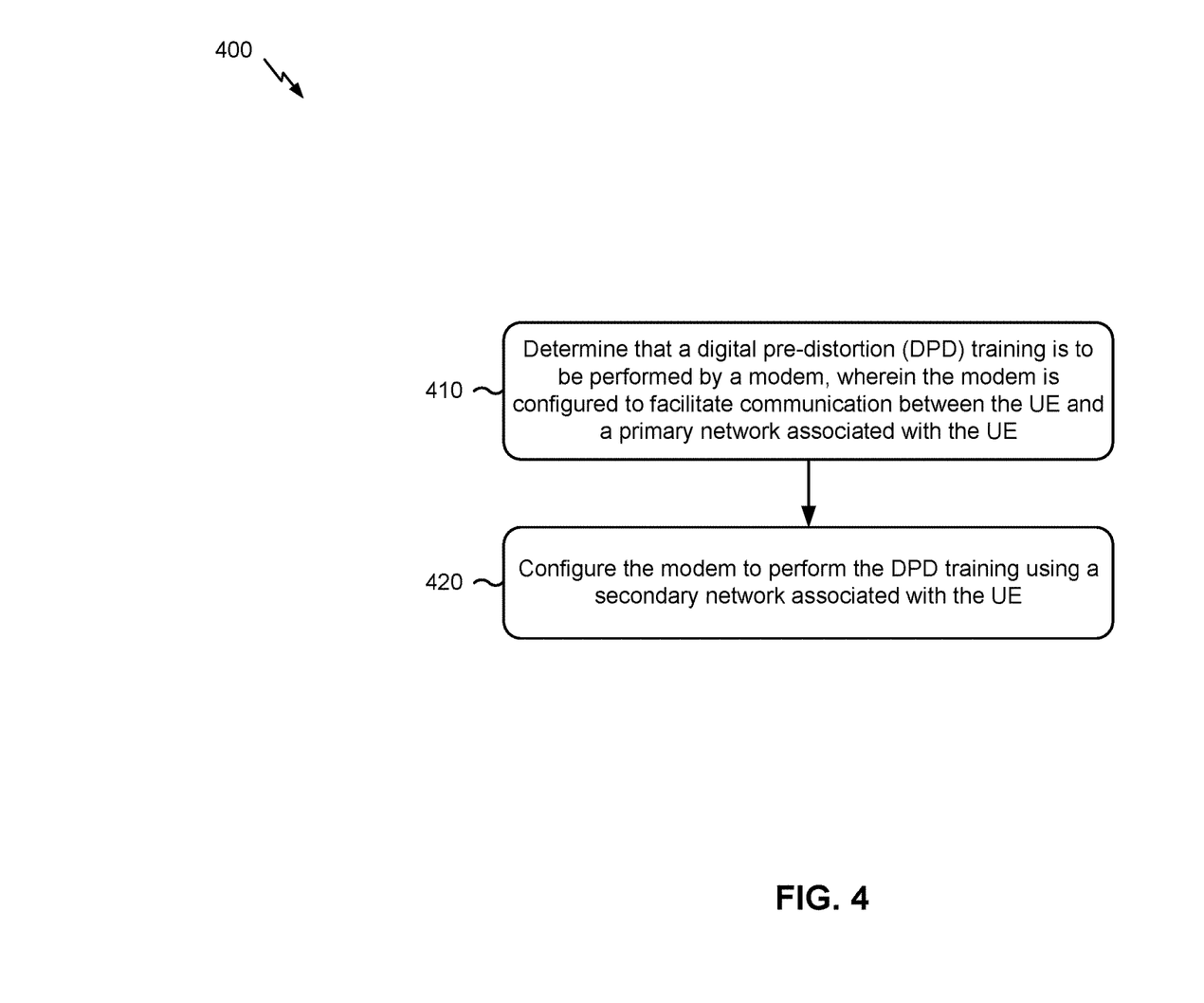
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs DPD training using a secondary network.

As shown in FIG. 4, in some aspects, process 400 may include determining that a digital pre-distortion (DPD) training is to be performed by a modem, wherein the modem is configured to facilitate communication between the UE and a primary network associated with the UE (block 410). For example, UE 120 (e.g., using transmit processor 264, TX MIMO processor 266, controller/processor 280, and/or the like) may determine that the DPD training is to be performed. In some aspects, UE 120 may determine that the DPD training is to be performed based at least in part on monitoring one or more characteristics of UE 120, based on a schedule to perform DPD training, and/or the like.

As further shown in FIG. 4, in some aspects, process 400 may include configuring the modem to perform the DPD training using a secondary network associated with the UE (block 420). For example, UE 120 (e.g., using transmit processor 264, TX MIMO processor 266, controller/processor 280, and/or the like) may configure the modem of UE 120 to perform the DPD training via Wi-Fi network 304. In some aspects, UE 120 may configure the modem to perform the DPD training based at least in part on determining that the modem is to perform the DPD training.

Process 400 may include additional aspects, such as any single aspect or any combination of aspects described below and/or in connection with one or more other processes described elsewhere herein.

In a first aspect, the primary network is a licensed network associated with a cellular communication system and the secondary network is an unlicensed network that is not associated with the cellular communication system. In a second aspect, alone or in combination with the first aspect, the primary network comprises a 5G network and the secondary network comprises a Wi-Fi network.

In a third aspect, alone or in combination with one or more of the first through second aspects, the modem is configured to select at least one of a transmission timing or a transmission waveform for the DPD training using the secondary network. In a fourth aspect, alone or in combination with one or more of the first through third aspects, the modem is configured to select the transmission timing or the transmission waveform based at least in part on a user input received by the UE. In a fifth aspect, alone or in combination with one or more of the first through fourth aspects, the modem is configured to select a transmission timing for the DPD training, switch a mixer of the modem to a band of the secondary network, perform the DPD training, and switch the mixer of the modem back to a band of the primary network. In a sixth aspect, alone or in combination with one or more of the first through fifth aspects, the modem is configured to facilitate communication between the UE and the primary network and facilitate communication between the UE and the secondary network.

In a seventh aspect, alone or in combination with one or more of the first through sixth aspects, the primary network comprises a 5G network and the DPD training corresponds to a sub-6 5G DPD training, and the secondary network has sufficient bandwidth to perform the sub-6 5G DPD training. In an eighth aspect, alone or in combination with one or more of the first through seventh aspects, the UE is configured to detect a temperature change, associated with the UE, that satisfies a threshold and determine that the DPD training is to be performed based at least in part on the temperature change satisfying the threshold. In a ninth aspect, alone or in combination with one or more of the first through eighth aspects, the modem performs the DPD training based at least in part on transmitting a signal to the secondary network and receiving a loopback signal from the secondary network.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a digital pre-distortion (DPD) training is to be performed by a modem,
      wherein the modem is configured to facilitate communication between the UE and a primary network associated with the UE; and
   configuring the modem to perform the DPD training using a secondary network associated with the UE.

2. The method of claim 1, wherein the primary network is a licensed network associated with a cellular communication system and the secondary network is an unlicensed network that is not associated with the cellular communication system.

3. The method of claim 1, wherein the primary network comprises a 5G network and the secondary network comprises a Wi-Fi network.

4. The method of claim 1, wherein the modem is configured to select at least one of a transmission timing or a transmission waveform for the DPD training using the secondary network.

5. The method of claim 4, wherein the modem is configured to select the transmission timing or the transmission waveform based at least in part on a user input received by the UE.

6. The method of claim 1, wherein the modem is configured to select a transmission timing for the DPD training, switch a mixer of the modem to a band of the secondary network, perform the DPD training, and switch the mixer of the modem back to a band of the primary network.

7. The method of claim 1, wherein the modem is configured to facilitate communication between the UE and the primary network and facilitate communication between the UE and the secondary network.

8. The method of claim 1, wherein the primary network comprises a 5G network and the DPD training corresponds to a sub-6 5G DPD training, and the secondary network has sufficient bandwidth to perform the sub-6 5G DPD training.

9. The method of claim 1, wherein the UE is configured to detect a temperature change, associated with the UE, that satisfies a threshold and determine that the DPD training is to be performed based at least in part on the temperature change satisfying the threshold.

10. The method of claim 1, wherein the modem performs the DPD training based at least in part on transmitting a signal to the secondary network and receiving a loopback signal from the secondary network.

11. A user equipment (UE) for wireless communication, comprising:
 a memory; and
 one or more processors operatively coupled to the memory, the memory and the one or more processors configured to:
  determine that a digital pre-distortion (DPD) training is to be performed by a modem,
   wherein the modem is configured to facilitate communication between the UE and a primary network associated with the UE; and
  configure the modem to perform the DPD training using a secondary network associated with the UE.

12. The UE of claim 11, wherein the primary network is a licensed network associated with a cellular communication system and the secondary network is an unlicensed network that is not associated with the cellular communication system.

13. The UE of claim 11, wherein the primary network comprises a 5G network and the secondary network comprises a Wi-Fi network.

14. The UE of claim 11, wherein the modem is configured to select at least one of a transmission timing or a transmission waveform for the DPD training using the secondary network.

15. The UE of claim 14, wherein the modem is configured to select the transmission timing or the transmission waveform based at least in part on a user input received by the UE.

16. The UE of claim 11, wherein the modem is configured to select a transmission timing for the DPD training, switch a mixer of the modem to a band of the secondary network, perform the DPD training, and switch the mixer of the modem back to a band of the primary network.

17. The UE of claim 11, wherein the modem is configured to facilitate communication between the UE and the primary network and facilitate communication between the UE and the secondary network.

18. The UE of claim 11, wherein the primary network comprises a 5G network and the DPD training corresponds to a sub-6 5G DPD training, and the secondary network has sufficient bandwidth to perform the sub-6 5G DPD training.

19. The UE of claim 11, wherein the UE is configured to detect a temperature change, associated with the UE, that satisfies a threshold and determine that the DPD training is to be performed based at least in part on the temperature change satisfying the threshold.

20. The UE of claim 11, wherein the modem performs the DPD training based at least in part on transmitting a signal to the secondary network and receiving a loopback signal from the secondary network.

21. A non-transitory computer-readable medium storing one or more instructions for wireless communication, the one or more instructions comprising:
 one or more instructions that, when executed by one or more processors of a user equipment (UE), cause the one or more processors to:
  determine that a digital pre-distortion (DPD) training is to be performed by a modem,
   wherein the modem is configured to facilitate communication between the UE and a primary network associated with the UE; and
  configure the modem to perform the DPD training using a secondary network associated with the UE.

22. The non-transitory computer-readable medium of claim 21, wherein the primary network is a licensed network associated with a cellular communication system and the secondary network is an unlicensed network that is not associated with the cellular communication system.

23. The non-transitory computer-readable medium of claim 21, wherein the modem is configured to select at least one of a transmission timing or a transmission waveform for the DPD training using the secondary network.

24. The non-transitory computer-readable medium of claim 23, wherein the modem is configured to select the transmission timing or the transmission waveform based at least in part on a user input received by the UE.

25. The non-transitory computer-readable medium of claim 21, wherein the modem is configured to select a transmission timing for the DPD training, switch a mixer of the modem to a band of the secondary network, perform the DPD training, and switch the mixer of the modem back to a band of the primary network.

26. An apparatus for wireless communication, comprising:
 means for determining that a digital pre-distortion (DPD) training is to be performed by a modem,
  wherein the modem is configured to facilitate communication between the apparatus and a primary network associated with the apparatus; and
 means for configuring the modem to perform the DPD training using a secondary network associated with the apparatus.

27. The apparatus of claim 26, wherein the primary network comprises a 5G network and the secondary network comprises a Wi-Fi network.

28. The apparatus of claim 26, wherein the modem is configured to facilitate communication between the apparatus and the primary network and facilitate communication between the apparatus and the secondary network.

29. The apparatus of claim 26, wherein the primary network comprises a 5G network and the DPD training corresponds to a sub-6 5G DPD training, and the secondary network has sufficient bandwidth to perform the sub-6 5G DPD training.

30. The apparatus of claim 26, wherein the apparatus is configured to detect a temperature change, associated with the apparatus, that satisfies a threshold and determine that the DPD training is to be performed based at least in part on the temperature change satisfying the threshold.

* * * * *